US010665368B2

(12) United States Patent
Doye (10) Patent No.: US 10,665,368 B2
(45) Date of Patent: May 26, 2020

(54) CABLE SUPPORT

(71) Applicant: 3M INNOVATIVE PROPERTIES COMPANY, St. Paul, MN (US)

(72) Inventor: Dennis L. Doye, Cedar Park, TX (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 16/286,864

(22) Filed: Feb. 27, 2019

(65) Prior Publication Data

US 2019/0318851 A1    Oct. 17, 2019

Related U.S. Application Data

(60) Provisional application No. 62/658,650, filed on Apr. 17, 2018.

(51) Int. Cl.
| | | |
|---|---|---|
| *H01B 17/00* | (2006.01) |
| *H01B 17/14* | (2006.01) |
| *H01B 7/04* | (2006.01) |
| *H01B 7/08* | (2006.01) |

(52) U.S. Cl.
CPC .............. *H01B 17/14* (2013.01); *H01B 7/04* (2013.01); *H01B 7/0823* (2013.01); *H01B 7/0838* (2013.01); *H01B 7/0861* (2013.01)

(58) Field of Classification Search
CPC .......... H01B 7/02; H01B 7/04; H01B 7/0823; H01B 7/0838; H01B 7/0861
USPC ................................................. 174/74 R, 79
See application file for complete search history.

(56) References Cited

U.S. PATENT DOCUMENTS

| 4,531,807 | A | * | 7/1985 | Trigon | ............... | H01R 13/5213 |
| | | | | | | 439/866 |
| 5,530,787 | A | * | 6/1996 | Arnett | .................. | G02B 6/3887 |
| | | | | | | 385/137 |
| 5,890,926 | A | * | 4/1999 | Pauza | .................. | H01R 13/562 |
| | | | | | | 439/445 |
| 6,049,040 | A | * | 4/2000 | Biles | ..................... | H02G 3/0487 |
| | | | | | | 174/101 |
| 6,134,370 | A | * | 10/2000 | Childers | .............. | G02B 6/4478 |
| | | | | | | 174/74 R |
| 6,554,489 | B2 | * | 4/2003 | Kent | ..................... | G02B 6/3829 |
| | | | | | | 385/135 |
| 7,001,081 | B2 | * | 2/2006 | Cox | ..................... | G02B 6/3887 |
| | | | | | | 385/86 |
| 9,360,649 | B2 | * | 6/2016 | Chang | .................. | G02B 6/4478 |
| 9,690,069 | B2 | * | 6/2017 | Chang | .................. | G02B 6/4478 |

(Continued)

*Primary Examiner* — William H. Mayo, III
(74) *Attorney, Agent, or Firm* — Robert S. Moshrefzadeh (57) ABSTRACT

A cable support for receiving and supporting a cable that includes a plurality of conductors extending along the length of the cable and arranged along the width of the cable, includes: a cane-shaped base having a substantially straight base portion and a curved base portion. The cane-shaped base includes a cable-side major surface and an opposing back-side major surface. At least a first portion of the back-side major surface in the curved base portion faces a second portion of the back-side major surface in the straight base portion. A plurality of discrete spaced apart side walls are disposed on the cable-side major surface along each longitudinal edge of the cane-shaped base. At least one side wall is disposed on the straight base portion and at least one side wall is disposed on the curved base portion.

15 Claims, 6 Drawing Sheets

(56) References Cited

U.S. PATENT DOCUMENTS

2010/0277041 A1\* 11/2010 Yamazaki ............... H03H 9/19
310/367
2012/0298395 A1\* 11/2012 Gundel ............... H01B 7/0838
174/105 R \* cited by examiner

CABLE SUPPORT

FIELD OF DISCLOSURE

The disclosure generally relates to cable management systems, particularly to a cable support for receiving and supporting cables, and to a cable assembly including a substantially flat cable and at least one cable support.

BACKGROUND

Organizing and routing cables may require cable support systems and routing assemblies to manage cables coupled to devices, for instance, communication devices and/or ports. The use of numerous cables in conjunction with a device can create organizational and storage related issues and can potentially damage the cables. There is also a constant requirement for retaining and routing of pipes and cables for efficient space management in vehicles.

SUMMARY

According to the various aspects and embodiments described further in this disclosure a cable support for receiving and supporting substantially flat cables is provided, said cable support capable of substantially preventing the cable from lateral movement when resting on said support.

An aspect of the present disclosure relates to a cable support for receiving and supporting a substantially flat cable. The flat cable includes a plurality of conductors extending along a length of the cable and arranged generally in a plane along a width of the cable. The cable support includes a cane-shaped base having a substantially straight base portion and a curved base portion. The cane-shaped base includes a cable-side major surface and an opposing back-side major surface, where at least a first portion of the back-side major surface in the curved base portion faces a second portion of the back-side major surface in the straight base portion. The cane-shaped base further includes a plurality of discrete spaced apart side walls disposed on the cable-side major surface along each longitudinal edge of the cane-shaped base, such that at least one side wall is disposed on the straight base portion and at least one side wall is disposed on the curved base portion. When the cable support of the above configuration receives and supports the cable, the cable rests on the cable-side major surface of at least the straight base portion between at least some of the side walls, the side walls preventing the cable from lateral movement relative to the base.

Another aspect of the disclosure relates to a cable support for supporting a substantially flat cable including a plurality of conductors extending along a length of the cable and arranged generally in a plane along a width of the cable. The cable support includes a substantially flat elongated base bent to have a curved base portion extending from a substantially straight base portion. The cable support further includes pluralities of discrete spaced apart first and second side walls disposed on a same side of the base along opposing and parallel respective first and second longitudinal edges of the elongated base. The first and second side walls are in one-to-one alignment with each other, such that when the cable support receives and supports the flat cable, the flat cable rests on at least the straight base portion between at least some of the aligned first and second side walls, the first and second side walls preventing the cable from lateral movement relative to the base.

A further aspect of the disclosure relates to a cable assembly including a substantially flat cable having a plurality of conductors extending along a length of the cable and arranged generally in a plane along a width of the cable. The assembly further includes first and second cable supports, each cable support including a substantially flat elongated base bent to have a curved base portion extending from a substantially straight base portion. At least one sidewall is disposed on a same side of the base along each of opposing parallel first and second longitudinal edges of the elongated base. According to this configuration, the straight, but not the curved, base portion of each cable support is attached to the cable with the cable resting on at least the straight base portion of the cable support. Further, when the substantially flat cable is substantially straight, the first and second cable supports are on opposite sides of the substantially flat cable.

A further aspect of the disclosure relates to cable support for supporting a substantially flat cable including a plurality of conductors extending along a length of the cable and arranged generally in a plane along a width of the cable. The cable support includes a curved base portion substantially centered on a central axis and extending along a length of the base portion between opposing longitudinal ends of the base portion. The longitudinal ends define a half-way point therebetween along the length of the base portion. A transverse cross-section of the base portion defines an arc subtending an angle from about 180 degrees to about 350 degrees with respect to the central axis. The cable support further includes first and second pairs of side walls disposed on a same side of the base portion along opposing and parallel first and second longitudinal edges of the base between the half-way point and the respective first and second longitudinal ends of the base portion. Further, the side walls in each pair of sidewalls are in one-to-one alignment with each other.

Yet another aspect of the disclosure relates to a cable assembly including a substantially flat cable having a plurality of conductors extending along a length of the cable and arranged generally in a plane along a width of the cable. The cable assembly further includes first and second cable supports, each cable support includes a curved base portion substantially centered on a central axis and extending along a length of the base portion between opposing longitudinal ends of the base portion. The longitudinal ends define a half-way point therebetween along the length of the base portion. A transverse cross-section of the base portion defines an arc subtending an angle from about 180 degrees to about 350 degrees with respect to the central axis. The cable support further includes at least one sidewall disposed on a same side of the curved base portion along each of opposing parallel first and second longitudinal edges of the elongated base. The curved base portion of each cable support is attached to the cable at the half-way point of the base portion, such that when the substantially flat cable is substantially straight, the first and second cable supports are on opposite sides of the substantially flat cable.

Yet another aspect of the disclosure relates to a cable support for receiving and supporting a substantially flat cable including a plurality of conductors extending along a length of the cable and arranged generally in a plane along a width of the cable. The cable support includes a partial cylindrical-shaped base portion defining an arc having a central angle from about 180 degrees to about 350 degrees, and an inner diameter in a range from about 5 mm to about 50 mm. The cable support further includes a pluralities of side walls disposed along opposing and parallel first and second longitudinal edges of the base portion. According to such configuration, when the cable support receives and supports the cable, the cable rests on the base portion between at least some of the side walls, the side walls preventing the cable from lateral movement relative to the base portion.

BRIEF DESCRIPTION OF DRAWINGS

The various aspects of the disclosure will be discussed in greater detail with reference to the accompanying figures where, FIGS. 1 and 2 schematically show perspective views of the cable support according to an embodiment.

The figures are not necessarily to scale. Like numbers used in the figures refer to like components. However, it will be understood that the use of a number to refer to a component in a given figure is not intended to limit the component in another figure labeled with the same number.

DETAILED DESCRIPTION OF ILLUSTRATIVE EMBODIMENTS

Figure 1:
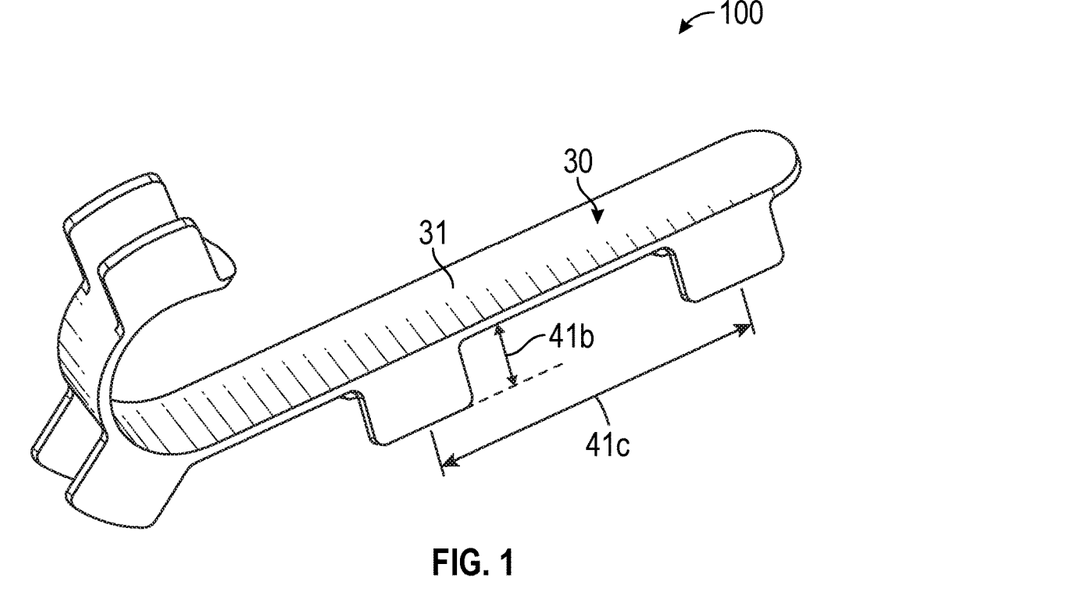
Figure 2:
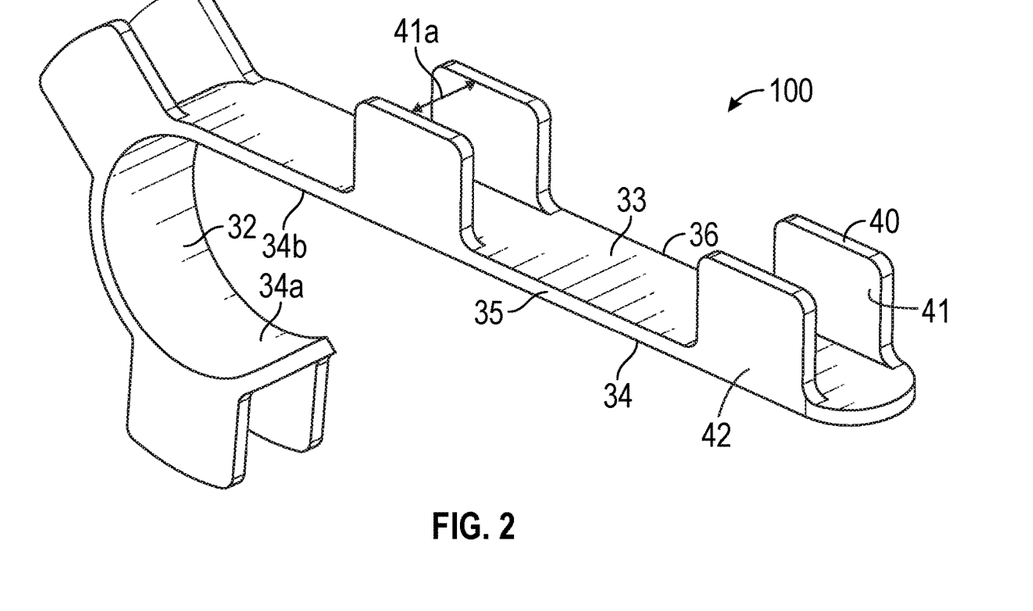
Figures 5, 6:
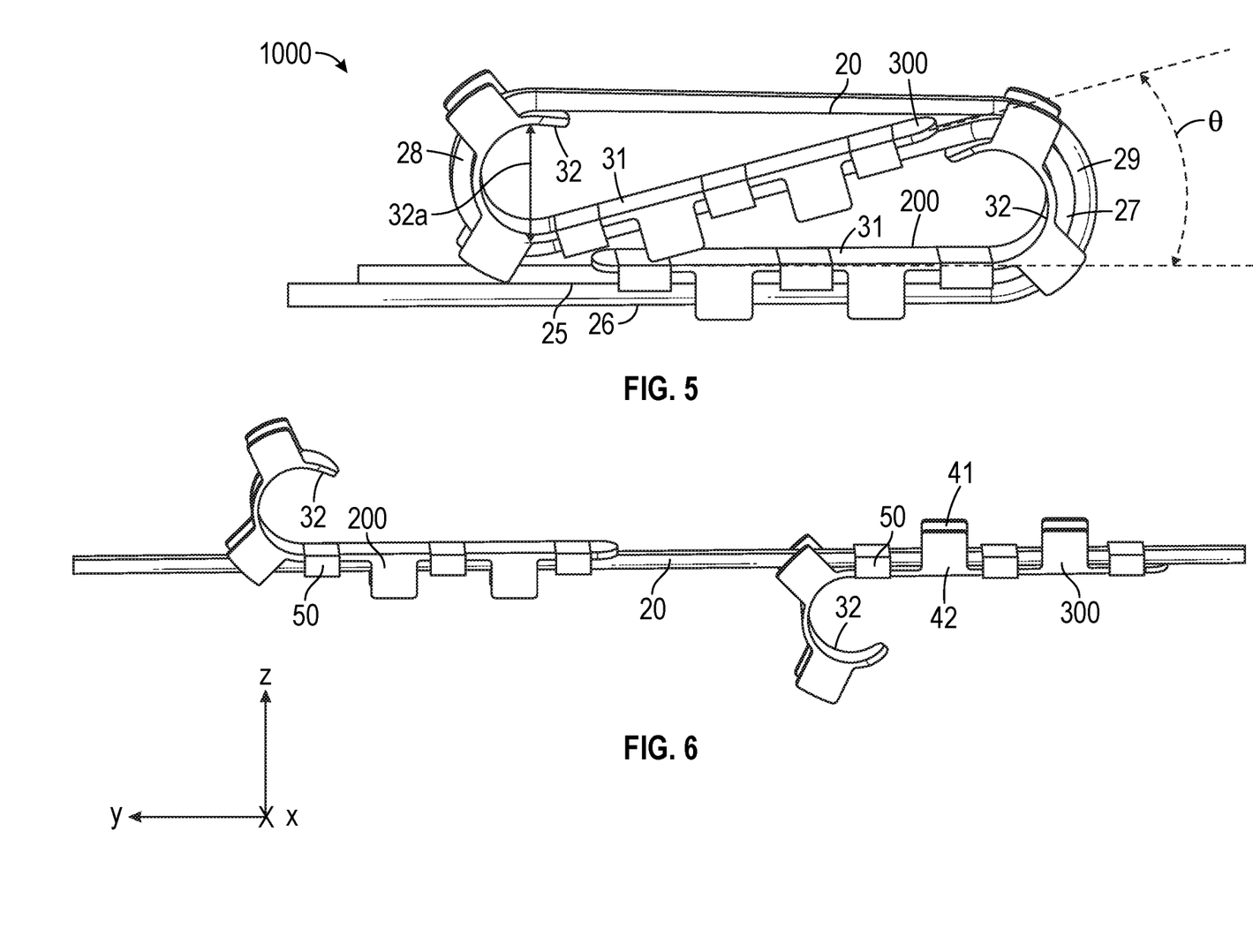
FIGS. 5 and 6 schematically show a cable assembly having a substantially flat cable assembled with a disclosed cable support.

According to an embodiment schematically illustrated in FIGS. 1 and 2, a cable support 100 for receiving and supporting a substantially flat cable includes a base 30 that is substantially cane-shaped. The base 30 has a substantially straight base portion 31 and a curved base portion 32. As shown schematically in FIGS. 5 and 6, a substantially flat and flexible cable 20 may be supported by the cable support 100 by resting on a cable-side major surface 33 of at least the straight base portion 31 of the cable support 100 as illustrated in FIG. 6, or rest on both the straight and curved base portions as illustrated schematically in FIG. 5. The base 30 further includes a back-side major surface 34 opposing the cable-side major surface 33. At least a first portion 34a of the back-side major surface 34 in the curved base portion 32 faces a second portion 34b of the back-side major surface 34 in the straight base portion.

A plurality of sidewalls 40 are disposed on the cable-side major surface 33 along each longitudinal edge 35, 36 of the base 30. The plurality of sidewalls are discrete and spaced apart from each other. In an aspect, at least one sidewall is disposed on the straight base portion 31 and at least one sidewall is disposed on the curved base portion 32. As shown in FIGS. 5 and 6, when cable 20 rests on the cable-side major surface 33 of at least the straight base portion 31, the cable is held between at least some of the sidewalls 40, such that the sidewalls 40 prevent the cable from lateral movement relative to the base 30. In other words, the side walls help secure the cable in place.

The plurality of sidewalls 40 includes pluralities of discrete, spaced apart, first side walls 41 and second sidewalls 42. The spacing 41c between the side walls may be such to assist in preventing the cable from sliding off the base. In some cases, the spacing may be at least 1 mm, or at least 2 mm, or at least 5 mm. These sidewalls 41, 42 are formed along generally opposing and parallel respective first and second longitudinal edges 35, 36. In an aspect as illustrated in FIGS. 1 and 2, the first and second sidewalls 41, 42 are in one-to-one alignment with each other. The cable support 100 is designed to receive and support the generally flat cable such that the flat cable rests on at least the straight base portion between at least some of the aligned first and second side walls 41, 42 such that the sidewalls prevent the cable from lateral movement relative to the base 30. In other words, the side walls help secure the cable in place.

The lateral distance 41a, as shown in FIG. 2, between a pair of one-to-one aligned first and second sidewalls 41, 42 may be less than 40 mm, or less than 20 mm, or less than 15 mm. Further, as shown in FIG. 1, a height 41b of each sidewall may be between about 5 to 20 mm, or between 10 to 15 mm. The dimensions of the lateral distance 41a and the height 41b mentioned above is only exemplary and may vary depending on the cable to be accommodated between these sidewalls. Generally, the height 41b of the sidewalls is greater than an average thickness of the substantially flat cable. The height of the first and second sidewalls 41, 42 are provided to be up to two times, or up to three times the average thickness of the substantially flat cable.

Figure 3:
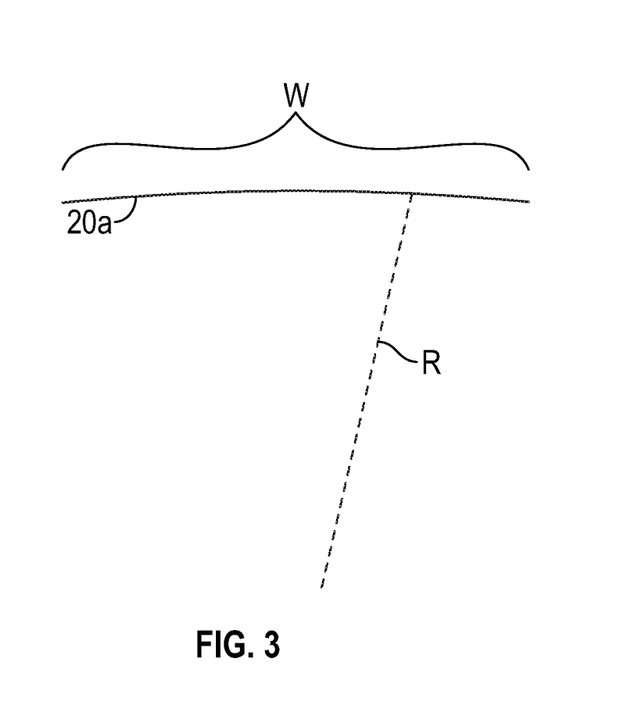
FIG. 3 schematically shows the relationship between the width of a disclosed cable to the radius of curvature of its cross-section.

As schematically represented in FIG. 3, a best fit radius of curvature R of a cross-section 20a of the substantially flat cable is greater than the width W of the cable. The radius of curvature R may be greater than at least 5 times, or 10 times, or 20 times, or 50 times, or 100 times the width W of the cable.

Figure 4:
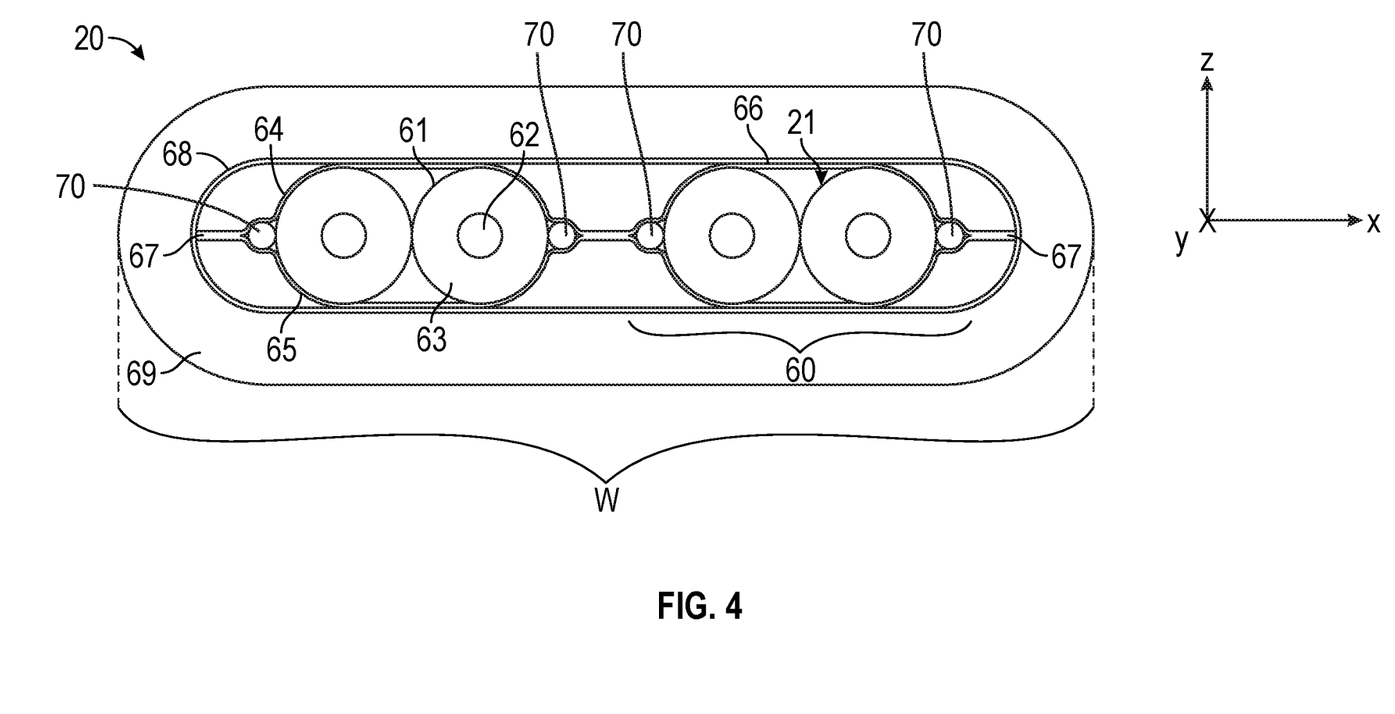
FIG. 4 schematically shows a cross section of a substantially flat cable carrying a plurality of conductor sets.

In general, the cable supports disclosed herein can support any cable that is substantially flat and substantially flexible. For example, FIG. 4 schematically illustrates a substantially flat cable 20. The cable includes a plurality of conductors 21 extending along a length y of the cable and arranged generally in a plane xy along a width x of the cable. The substantially flat cable 20 includes a plurality of conductor sets 60 spaced part across a width x of the cable and extending along a length y of the cable 20. Each conductor set includes one or more conductors 21. At least one of the conductors is an insulated conductor 61 having a central conductor 62 surrounded by a dielectric material 63. The insulated conductors 61 are arranged generally in a single plane. In general, the disclosed cable supports may be advantageously used with any cable that is substantially flat along its width direction and sufficiently flexible along its length direction.

Polymeric layers 64, 65 are disposed on opposite sides of the conductors 21 where each polymeric layer substantially conforms to and takes the shape of at least the majority of the periphery of the conductor set 60. The polymeric layers 64, 65 include cover portions 66 and pinched portions 67. The cover portions 66 in combination substantially surround the plurality of the conductor sets 60 and the pinched portions 67 in combination form pinched portions of the cable on each side of the plurality of conductor sets 60. In some cases, such as in the case illustrated in FIG. 4, the plurality of conductor sets 60 are completely surrounded by a shield 68 to substantially isolate the cable from the environment. The shield 68 may be conformably shaped to substantially surround the conductor sets 60. In certain cases, the shield 68 includes a metal, such as aluminum, or other metals. In some cases, the shield 68 may include a stand-alone conductive shielding film, such as a compliant or flexible metal foil. The construction of the shield may be selected based on a number of design parameters suitable for the intended application, such as, e.g., flexibility, electrical performance, and configuration of the shielded electrical cable (such as, e.g., presence and location of drain conductors).

The cable 20 may optionally include one or more drain conductors 70 having one or more drain wires. The drain conductors 70 may be spaced apart from and extend in substantially the same direction as insulated conductors 61. One or more of the drain conductors 70 may not physically contact the shield 68, but may be an individual element in the cable construction that is independently terminated to any suitable individual contact element of any suitable termination component. However, in other aspects, one or more of the conductors 70 may physically contact the shield 68 such that grounding the given drain conductor alone may also ground the shield. In certain aspects, the substantially flat cable 20 includes a jacket 69 that partially or completely surrounds the shield 68. The jacket 69 may be either molded over, or extruded over, the plurality of conductor sets 60 so as to encapsulate the conductor sets. Other methods of encapsulating the conductor sets with the jacket 69 is within the scope of this disclosure.

As illustrated schematically in FIGS. 5 and 6, a cable assembly 1000 includes a substantially flat and flexible cable 20. The cable assembly 1000 further includes a first cable support 200 and a second cable support 300. Each of the cable supports 200, 300 are designed in the manner as explained with reference to FIGS. 1 and 2. The straight base portion 31 (FIG. 1) of each cable support is attached to the cable with the cable resting on at least the straight base portion of the cable support. For example, in FIG. 5, the cable rests on both the straight and curved base portions of the two cable supports, whereas in FIG. 6, the cable rests only on the straight base portions of the two cable supports. In the embodiment exemplified in FIG. 6, the curved base portions 32 of the two cable supports are not attached to the cable, although in some cases, the curved base portions may be attached to the cable. The attachment may be accomplished by wrapping one or more fasteners 50 around both the cable 20 and the support 200, 300. Fasteners 50 may be detachable, such as fabric-type fasteners, for instance, Velcro®, removable snap fits, cable ties, or the like. In certain applications, the fasteners 50 may be permanent, such as glue, or the like. As illustrated in FIG. 6, when the substantially flat cable 20 is substantially straight along the length y of the cable, the first and second cable supports 200, 300 are disposed on opposite sides of the cable 20 at a suitable distance from each other.

On the other hand, when the cable is longitudinally flexed so that it rests substantially on the entire base of each cable support as schematically illustrated in FIG. 5, the straight base portion 31 of the second cable support 300 is aligned with the straight base portion 31 of the first cable support 200 so that the two straight base portions make an angle θ with each other. In some embodiments, the angle θ made by the straight base portions 31 of the cable supports 200, 300 may be less than 90°, or less than 80°, less than 60°, or less than 45°. The inner diameter 32a of the curved base portion 32 may be about 5-80 mm, or about 5-50 mm or about 5-30 mm. Furthermore, as also illustrated in FIG. 5, a first straight cable portion 25 of the cable 20 rests on the straight base portion of the first cable support 200. The cable extends from the first straight cable portion 25 and is wrapped around the curved base portion 32 of the first cable support 200 to form a first curved cable portion 27, and extends further to rest on the straight base portion 31 of the second cable support 300. The straight base portion of the second cable support 300 is angularly aligned with the straight base portion of the first cable support 200. The cable 20 extends further to wrap around the curved base portion 32 of the second cable support 300 to form a second curved cable portion 28. The cable further extends between the curved base portion of the second cable support 300 up to the curved base portion of the first cable support 200 where it overlaps the first curved cable portion 27 to form a third curved cable portion 29, such that the first curved portion 27 of the cable is disposed between the third curved portion 29 and the curved base portion 32 of the first cable support 200. The third curved cable portion 29 extends further to form a second straight portion 26. The second straight portion 26 rests on the first straight portion 25 such that the first straight portion 25 of the cable is disposed between the second straight portion 26 and the straight base portion 31 of the first cable support 200.

According to an embodiment schematically illustrated in FIGS. 7-11, a cable support 400 for receiving and supporting a substantially flat cable includes a curved base portion 410 defined by a central axis 415. The curved base portion 410 may be defined to have a partial cylindrical shape. The base portion 410 extends between longitudinal ends 420, 421 of the base portion. A halfway point 425 is defined between the longitudinal ends 420, 421 along the length of the base portion. The longitudinal ends 420, 421 are provided to be in an opposing relationship with each other. In some embodiments, the base portion 410 defines an arc 430 that subtends an angle α of about 180° to about 350° with respect to the central axis 415 as viewed in a transverse cross section illustrated in FIG. 10. The inner diameter 410c of the base portion 410 may be about 5-80 mm, or about 5-50 mm or about 5-30 mm.

Figures 7, 8, 9, 10, 11:
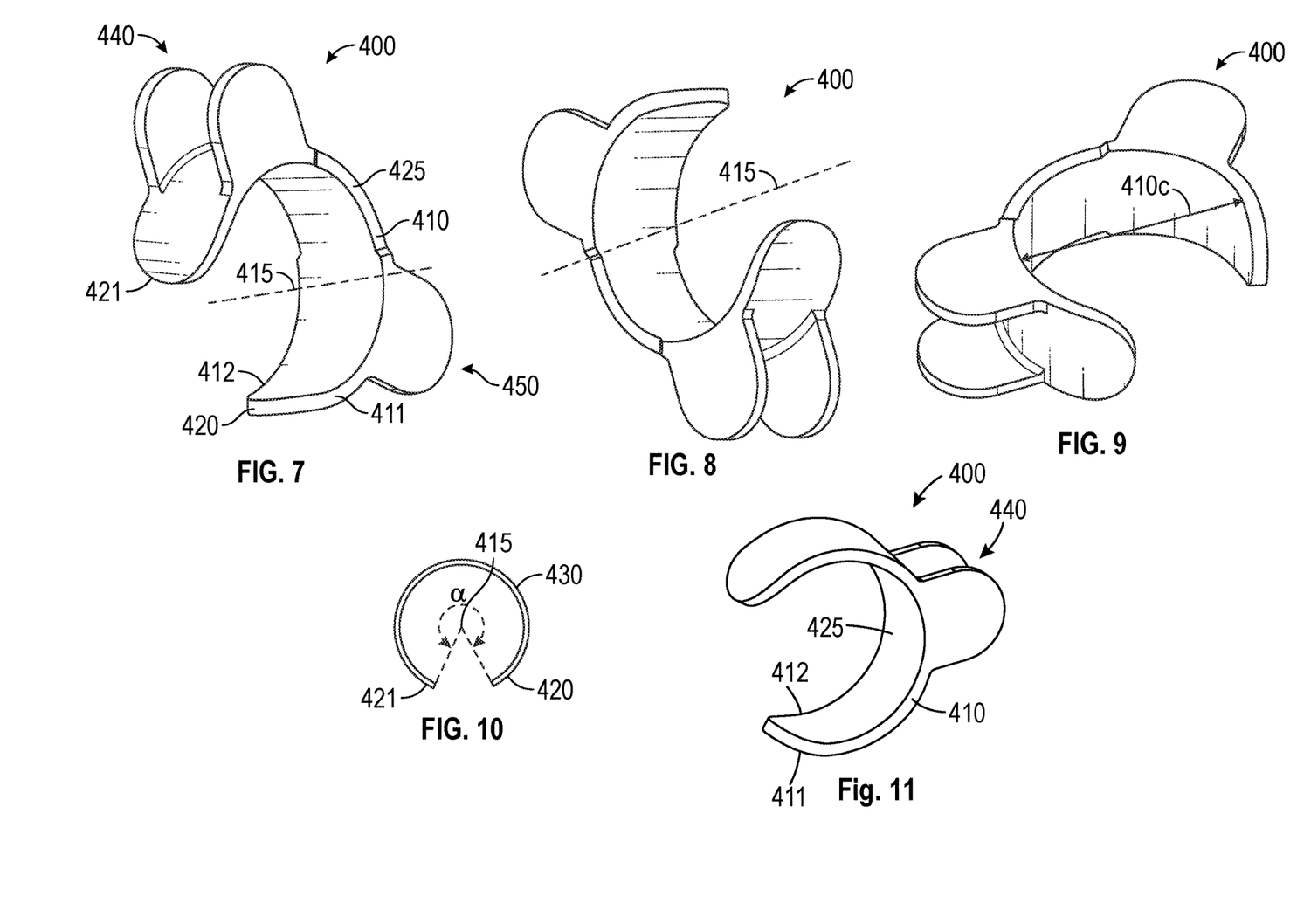
FIGS. 7-11 schematically show different views of a disclosed cable support.

In an aspect as illustrated in FIG. 11, the cable support 400 includes one pair of sidewalls 440 disposed substantially at the half way point 425. The sidewalls 440 are disposed on a same side of the curved base portion 410 along each of opposing parallel first and second longitudinal edges 411, 412. The cable support 400 is designed to receive and support the generally flat cable such that the flat cable rests on the base portion 410 between the pair of side walls 440 such that the sidewalls prevent the cable from lateral movement relative to the base portion 410. In other words, the side walls 440 help secure the cable in place.

Figure 12:
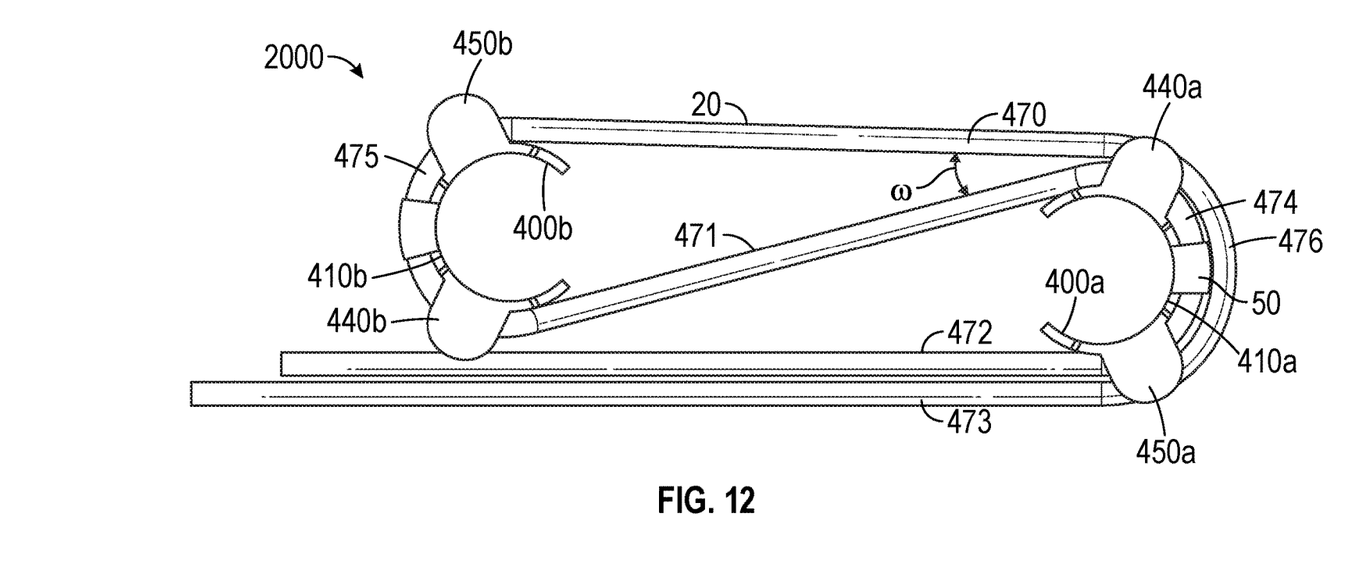
FIGS. 12 and 13 schematically show a cable assembly having a substantially flat cable assembled to a cable support.
Figure 13:
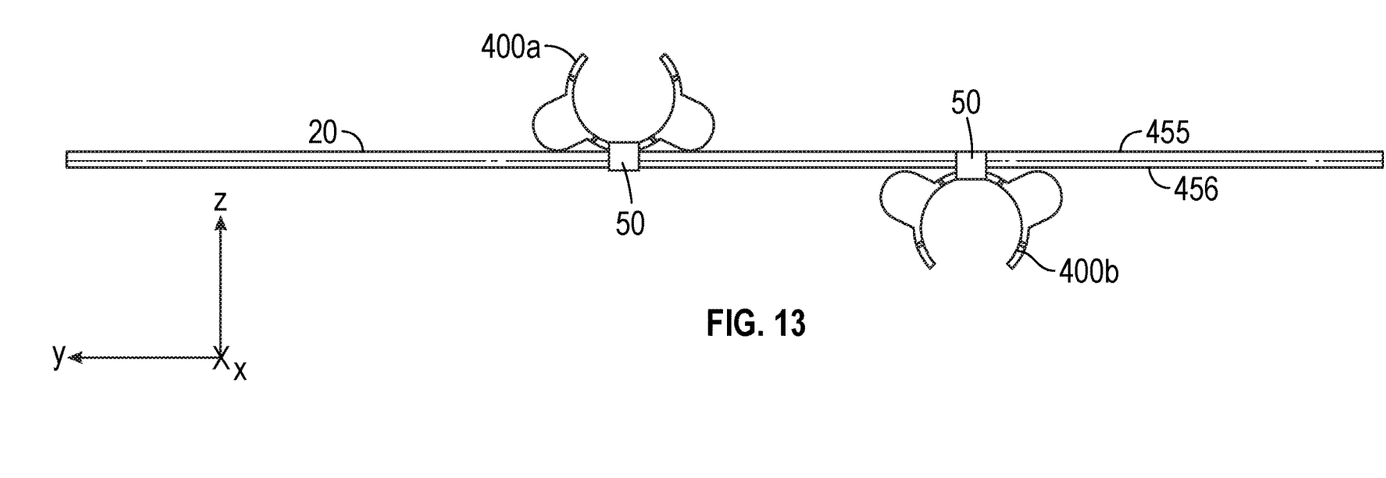

In another aspect as illustrated in FIG. 7, the cable support 400 includes a first pair of sidewalls 440 and a second pair of sidewalls 450. The first and second pairs of sidewalls 440, 450 are disposed on the same side of the base portion 410 along each of first and second longitudinal edges 411, 412. The first and second longitudinal edges 411, 412 are in an opposing and parallel alignment with each other. The first pair of sidewalls 440 is located between the halfway point 425 and the first longitudinal end 421 of the base portion 410. The second pair of sidewalls 450 is located between the halfway point 425 and the second longitudinal end 420 of the base portion 410. The sidewalls in each pair of sidewalls 440, 450 are in one-to-one alignment with each other. The spacing between each pair of side walls 440, 450 may be such to assist in preventing the cable from sliding off the base. In some cases, the spacing may be at least 1 mm, or at least 2 mm, or at least 5 mm. As shown in FIGS. 12 and 13, the cable support is designed to receive and support the generally flat cable such that the flat cable rests on the base portion between the aligned sidewalls of the first and second pairs of side walls as illustrated in FIG. 13 or rest on both the straight and curved base portions as illustrated schematically in FIG. 12. The sidewalls prevent the cable from lateral movement relative to the base portion 410. In other words, the pairs of side walls 440, 450 help secure the cable in place.

As illustrated schematically in FIGS. 12 and 13, a cable assembly includes a substantially flat and flexible cable 20. The cable includes a plurality of conductors extending along a length y of the cable and arranged generally in a plane xy along a width x of the cable. The cable assembly includes one or more of the cable supports 400. For example, in FIG. 12, the cable rests on both the straight and curved base portions of the two cable supports, whereas in FIG. 13, the cable rests only on the straight base portions of the two cable supports. As shown in FIG. 13, the substantially flat cable 20 includes a first major side 455 and a second major side 456 opposite the first major side 455. The first major side 455 of the cable 20 rests on a first cable support 400a and the second major side 456 of the cable 20 rests on a second cable support 400b. The curved base portion 410 (FIG. 7) of each cable support 400a, 400b is attached to the cable at approximately the half-way point 425 (FIG. 7) of the base portion, such that when the substantially flat cable is substantially straight along the length y, the first and second cable supports 400a, 400b are disposed on opposite sides of the substantially flat cable at a suitable distance from each other.

The first and second cable supports 400a, 400b disposed on the first and second major sides 455, 456 of the cable respectively are fastened to the cable with one or more fasteners 50, each fastener 50 being wrapped around the base portion 410 and the cable 20. The one or more fasteners 50 are wrapped at approximately the centre of each of the base portion 410. Fasteners 50 may be detachable, such as fabric-type fasteners, for instance Velcro®, removable snap fits, cable ties, or the like. In certain applications, the fasteners 50 may be permanent, such as glue, or the like.

As illustrated schematically in FIG. 12, the cable assembly 2000 includes a substantially flat and flexible cable 20 that includes a first straight cable portion 470 and a second straight cable portion 471. The first and second straight cable portions 470, 471 extend between the first and second cable supports 400a, 400b so that the first and second straight cable portions make an angle co with each other. In some embodiments, the angle co between the first and second straight cable portion 470, 471 may be less than 90°, or less than 60°, or less than 45°, or about 15-30°. The cable includes a third straight cable portion 472 and a fourth straight cable portion 473 parallel and adjacent to the third straight cable portion 472. The third and fourth straight cable portions 472, 473 extend between the first and second cable supports 400a, 400b and are disposed on the same side of the first and second cable supports 400a, 400b.

The third straight portion 472 extends around the curved base portion 410a between the aligned sidewalls 440a, 450a of the first cable support 400a to form a first curved cable portion 474. The first curved cable portion 474 extends between the first and second cable supports 400a, 400b to form the second straight cable portion 471. The second straight cable portion 471 extends between the first pair of sidewall 440a of the first cable support 400a and the first pair of sidewall 440b of the second cable support 400b. The second straight cable portion 471 extends around the curved base portion 410b between the aligned sidewalls 440b, 450b of the second cable support 400b to form a second curved cable portion 475. The second curved cable portion 475 extends between the second and first cable supports 400b, 400a to form the first straight cable portion 470. The second straight cable portion 471 is configured to make an angle co with the first straight cable portion 470. Further, the first straight cable portion 470 extends between the aligned sidewalls 440a, 450a to overlap the first curved cable portion 474 and forms a third curved cable portion 476, such that the first curved cable portion 474 is disposed between the third curved cable portion 476 and the curved base portion 410a of the first cable support 400a. The third curved cable portion 476 extends further to form the fourth straight cable portion 473. The fourth straight cable portion 473 is disposed parallel and adjacent to the third straight cable portion 472.

The height of the sidewalls 440a, 450a; 440b, 450b is greater than an average thickness of the substantially flat cable 20. For instance, the height of the sidewalls may be up to two times, or up to three times the average thickness of the substantially flat cable.

The cable support of the above described embodiments may be made of suitable material, such as metal or plastic, and may be made by any suitable process, such as molding, forming and/or machining processes.

The following is a list of embodiments described in this disclosure:

Embodiment 1 is a cable support for receiving and supporting a substantially flat cable including a plurality of conductors extending along a length of the cable and arranged generally in a plane along a width of the cable, the cable support including: a cane-shaped base having a substantially straight base portion and a curved base portion, the cane-shaped base including a cable-side major surface and an opposing back-side major surface, at least a first portion of the back-side major surface in the curved base portion faces a second portion of the back-side major surface in the straight base portion; and a plurality of discrete spaced apart side walls disposed on the cable-side major surface along each longitudinal edge of the cane-shaped base, such that at least one side wall is disposed on the straight base portion and at least one side wall is disposed on the curved base portion, such that when the cable support receives and supports the cable, the cable rests on the cable-side major surface of at least the straight base portion between at least some of the side walls, the side walls preventing the cable from lateral movement relative to the base.

Embodiment 2 is the cable support of Embodiment 1, wherein the plurality of discrete spaced apart side walls includes pluralities of discrete spaced apart first and second side walls disposed on the cable-side major surface along opposing and parallel respective first and second longitudinal edges of the cane-shaped base, wherein the first and second side walls are in one-to-one alignment with each other.

Embodiment 3 is the cable support of Embodiment 1, wherein a lateral separation between a pair of one-to-one aligned first and second side walls is less than about 20 mm.

Embodiment 4 is the cable support of Embodiment 1, wherein a lateral separation between a pair of one-to-one aligned first and second side walls is less than about 15 mm.

Embodiment 5 is the cable support of Embodiment 1, wherein a height of each sidewall is between about 5 to 20 mm.

Embodiment 6 is the cable support of Embodiment 1 wherein a height of each sidewall is between about 10 to 15 mm.

Embodiment 7 is the cable support of Embodiment 1 made of a plastic.

Embodiment 8 is the cable support of Embodiment 1 made of a metal.

Embodiment 9 is the cable support of Embodiment 1, wherein an inner diameter of the curved base portion is in a range from about 5 mm to about 50 mm.

Embodiment 10 is the cable support of Embodiment 1 wherein in a transverse cross-section of the substantially flat cable, a best fit radius of curvature of the cross-section is greater than at least 10 times the width of the cable.

Embodiment 11 is a cable support for supporting a substantially flat cable including a plurality of conductors extending along a length of the cable and arranged generally in a plane along a width of the cable, the cable support including: a substantially flat elongated base bent to have a curved base portion extending from a substantially straight base portion; and pluralities of discrete spaced apart first and second side walls disposed on a same side of the base along opposing and parallel respective first and second longitudinal edges of the elongated base, the first and second side walls in one-to-one alignment with each other, such that when the cable support receives and supports the flat cable, the flat cable rests on at least the straight base portion between at least some of the aligned first and second side walls, the first and second side walls preventing the cable from lateral movement relative to the base.

Embodiment 12 is the cable support of Embodiment 11 made of a plastic.

Embodiment 13 is the cable support of Embodiment 11 made of a metal.

Embodiment 14 is the cable support of Embodiment 11 wherein the first and second sidewalls are taller than an average thickness of the substantially flat cable.

Embodiment 15 is a cable assembly including: a substantially flat cable including a plurality of conductors extending along a length of the cable and arranged generally in a plane along a width of the cable; and first and second cable supports, each cable support including: a substantially flat elongated base bent to have a curved base portion extending from a substantially straight base portion; and at least one sidewall disposed on a same side of the base along each of opposing parallel first and second longitudinal edges of the elongated base, wherein the straight, but not the curved, base portion of each cable support is attached to the cable with the cable resting on at least the straight base portion of the cable support, and wherein when the substantially flat cable is substantially straight, the first and second cable supports are on opposite sides of the substantially flat cable.

Embodiment 16 is the cable assembly of Embodiment 15 wherein the straight base portion of each cable support is attached to the cable by a plurality of fasteners, each fastener wrapped around the straight base portion and the cable.

Embodiment 17 is the cable assembly of Embodiment 15 wherein the cable is wrapped around, and rests on, the curved base portion of each cable support, such that the straight base portions of the first and second cable supports make an oblique angle with each other, less than about 45 degrees.

Embodiment 18 is the cable assembly of Embodiment 15 wherein a first portion of the cable rests on the straight base portion of the first cable support and a second portion of the cable rests on the first portion of the cable, such that the first portion of the cable is disposed between the second portion of the cable and the straight base portion of the first cable support.

Embodiment 19 is the cable assembly of Embodiment 15 wherein the substantially flat cable includes: a plurality of conductor sets extending along the length of the cable and arranged generally in a plane along the width of the cable, each conductor set including one or more of the conductors in the plurality of conductors, at least one of the conductors being an insulated conductor, the insulated conductor including a central conductor surrounded by a dielectric material; first and second polymeric layers disposed on opposite sides of the cable, the first and second polymeric layers including cover portions and pinched portions arranged such that, in transverse cross section, the cover portions of the first and second polymeric layers in combination substantially surround the plurality of the conductor sets, and the pinched portions of the first and second polymeric layers in combination form pinched portions of the cable on each side of the plurality of conductor sets.

Embodiment 20 is the cable assembly of Embodiment 19 wherein the substantially flat cable further includes a shield completely surrounding the plurality of conductor sets.

Embodiment 21 is the cable assembly of Embodiment 20 wherein the shield includes a metal.

Embodiment 22 is the cable assembly of Embodiment 20 wherein the substantially flat cable further includes a jacket completely surrounding the shield.

Embodiment 23 is the cable assembly of Embodiment 22 wherein the jacket is molded over and encapsulates the plurality of conductor sets.

Embodiment 24 is the cable assembly of Embodiment 22 wherein the jacket is extruded over and encapsulates the plurality of conductor sets.

Embodiment 25 is a cable support for supporting a substantially flat cable including a plurality of conductors extending along a length of the cable and arranged generally in a plane along a width of the cable, the cable support including: a curved base portion substantially centered on a central axis and extending along a length of the base portion between opposing longitudinal ends of the base portion, the longitudinal ends defining a half-way point therebetween along the length of the base portion, a transverse cross-section of the base portion defining an arc subtending an angle from about 180 degrees to about 350 degrees with respect to the central axis; and first and second pairs of side walls disposed on a same side of the base portion along opposing and parallel first and second longitudinal edges of the base between the half-way point and the respective first and second longitudinal ends of the base portion, the side walls in each pair of sidewalls in one-to-one alignment with each other.

Embodiment 26 is a cable assembly, including: a substantially flat cable including a plurality of conductors extending along a length of the cable and arranged generally in a plane along a width of the cable; a first cable support disposed on a first major side of the cable and fastened to the cable; and a second cable support disposed on an opposite second major side of the cable and fastened to the cable.

Embodiment 27 is a cable assembly including: a substantially flat cable including a plurality of conductors extending along a length of the cable and arranged generally in a plane along a width of the cable; and first and second cable supports, each cable support including: a curved base portion substantially centered on a central axis and extending along a length of the base portion between opposing longitudinal ends of the base portion, the longitudinal ends defining a half-way point therebetween along the length of the base portion, a transverse cross-section of the base portion defining an arc subtending an angle from about 180 degrees to about 350 degrees with respect to the central axis; and at least one pair of sidewall disposed on a same side of the curved base portion along each of opposing parallel first and second longitudinal edges of the base; wherein the curved base portion of each cable support is attached to the cable at the half-way point of the base portion, such that when the substantially flat cable is substantially straight, the first and second cable supports are on opposite sides of the substantially flat cable.

Embodiment 28 is the cable assembly of Embodiment 27 wherein the base portion of each cable support is attached to the cable by a fastener, each fastener wrapped around the base portion and the cable.

Embodiment 29 is the cable assembly of Embodiment 27 wherein the cable is wrapped around, and rests on, the curved base portion of each cable support, such that the cable includes first and second straight cable portions extending between the first and second cable supports and making an oblique angle with each other less than about 45 degrees.

Embodiment 30 is the cable assembly of Embodiment 29 wherein the cable includes adjacent parallel third and fourth straight cable portions extending between, and disposed on a same side of, the first and second cable supports.

Embodiment 31 is a cable support for receiving and supporting a substantially flat cable including a plurality of conductors extending along a length of the cable and arranged generally in a plane along a width of the cable, the cable support including: a partial cylindrical-shaped base portion defining an arc having a central angle from about 180 degrees to about 350 degrees, and an inner diameter in a range from about 5 mm to about 50 mm; and a pluralities of side walls disposed along opposing and parallel first and second longitudinal edges of the base portion, such that when the cable support receives and supports the cable, the cable rests on the base portion between at least some of the side walls, the side walls preventing the cable from lateral movement relative to the base portion.

Embodiment 32 is the cable support of Embodiment 31 made of a plastic.

Embodiment 33 is the cable support of Embodiment 31 made of a metal.

Embodiment 34 is the cable support of Embodiment 31 wherein the sidewalls are taller than an average thickness of the substantially flat cable.

Descriptions for elements in figures should be understood to apply equally to corresponding elements in other figures, unless indicated otherwise. Although specific embodiments have been illustrated and described herein, it will be appreciated by those of ordinary skill in the art that a variety of alternate and/or equivalent implementations can be substituted for the specific embodiments shown and described without departing from the scope of the present disclosure. This application is intended to cover any adaptations or variations of the specific embodiments discussed herein. Therefore, it is intended that this disclosure be limited only by the claims and the equivalents thereof.

The invention claimed is:

1. A cable assembly comprising:
   a substantially flat cable comprising a plurality of conductors extending along a length of the cable and arranged generally in a plane along a width of the cable; and
   first and second cable supports, each cable support comprising:
   a substantially flat elongated base bent to have a curved base portion extending from a substantially straight base portion; and
   at least one sidewall disposed on a same side of the base along each of opposing parallel first and second longitudinal edges of the elongated base, wherein the straight, but not the curved, base portion of each cable support is attached to the cable with the cable resting on at least the straight base portion of the cable support, and wherein when the substantially flat cable is substantially straight, the first and second cable supports are on opposite sides of the substantially flat cable.

2. The cable assembly of claim 1, wherein the straight base portion of each cable support is attached to the cable by a plurality of fasteners, each fastener wrapped around the straight base portion and the cable.

3. The cable assembly of claim 1 wherein the cable is wrapped around, and rests on, the curved base portion of each cable support, such that the straight base portions of the first and second cable supports make an oblique angle with each other, less than about 45 degrees.

4. The cable assembly of claim 1, wherein a first portion of the cable rests on the straight base portion of the first cable support and a second portion of the cable rests on the first portion of the cable, such that the first portion of the cable is disposed between the second portion of the cable and the straight base portion of the first cable support.

5. The cable assembly of claim 1, wherein the substantially flat cable comprises:
   a plurality of conductor sets extending along the length of the cable and arranged generally in a plane along the width of the cable, each conductor set comprising one or more of the conductors in the plurality of conductors, at least one of the conductors being an insulated conductor, the insulated conductor comprising a central conductor surrounded by a dielectric material;
   first and second polymeric layers disposed on opposite sides of the cable, the first and second polymeric layers including cover portions and pinched portions arranged such that, in transverse cross section, the cover portions of the first and second polymeric layers in combination substantially surround the plurality of the conductor sets, and the pinched portions of the first and second polymeric layers in combination form pinched portions of the cable on each side of the plurality of conductor sets.

6. A cable support for supporting a substantially flat cable comprising a plurality of conductors extending along a length of the cable and arranged generally in a plane along a width of the cable, the cable support comprising:
   a curved base portion substantially centered on a central axis and extending along a length of the base portion between opposing longitudinal ends of the base portion, the longitudinal ends defining a half-way point therebetween along the length of the base portion, a transverse cross-section of the base portion defining an arc subtending an angle from about 180 degrees to about 350 degrees with respect to the central axis; and
   first and second pairs of side walls disposed on a same side of the base portion along opposing and parallel first and second longitudinal edges of the base between the half-way point and the respective first and second longitudinal ends of the base portion, the side walls in each pair of sidewalls in one-to-one alignment with each other.

7. A cable assembly, comprising:
   a substantially flat cable comprising a plurality of conductors extending along a length of the cable and arranged generally in a plane along a width of the cable;
   a first cable support of claim 6 disposed on a first major side of the cable and fastened to the cable; and
   a second cable support of claim 6 disposed on an opposite second major side of the cable and fastened to the cable.

8. A cable assembly comprising:
a substantially flat cable comprising a plurality of conductors extending along a length of the cable and arranged generally in a plane along a width of the cable; and
first and second cable supports, each cable support comprising:
a curved base portion substantially centered on a central axis and extending along a length of the base portion between opposing longitudinal ends of the base portion, the longitudinal ends defining a half-way point therebetween along the length of the base portion, a transverse cross-section of the base portion defining an arc subtending an angle from about 180 degrees to about 350 degrees with respect to the central axis; and
at least one pair of sidewalls disposed on a same side of the curved base portion along each of opposing parallel first and second longitudinal edges of the base;
wherein the curved base portion of each cable support is attached to the cable at the half-way point of the base portion, such that when the substantially flat cable is substantially straight, the first and second cable supports are on opposite sides of the substantially flat cable.

9. The cable assembly of claim 8, wherein the base portion of each cable support is attached to the cable by a fastener, each fastener wrapped around the base portion and the cable.

10. The cable assembly of claim 8, wherein the cable is wrapped around, and rests on, the curved base portion of each cable support, such that the cable comprises first and second straight cable portions extending between the first and second cable supports and making an oblique angle with each other less than about 45 degrees.

11. The cable assembly of claim 10, wherein the cable comprises adjacent parallel third and fourth straight cable portions extending between, and disposed on a same side of, the first and second cable supports.

12. A cable support for receiving and supporting a substantially flat cable comprising a plurality of conductors extending along a length of the cable and arranged generally in a plane along a width of the cable, the cable support comprising:
a partial cylindrical-shaped base portion defining an arc having a central angle from about 180 degrees to about 350 degrees, and an inner diameter in a range from about 5 mm to about 50 mm; and
a pluralities of side walls disposed along opposing and parallel first and second longitudinal edges of the base portion, such that when the cable support receives and supports the cable, the cable rests on the base portion between at least some of the side walls, the side walls preventing the cable from lateral movement relative to the base portion.

13. The cable support of claim 12 made of a plastic.

14. The cable support of claim 12 made of a metal.

15. The cable support of claim 12, wherein the sidewalls are taller than an average thickness of the substantially flat cable.

* * * * *